(12) United States Patent
Clark

(10) Patent No.: US 7,798,750 B2
(45) Date of Patent: Sep. 21, 2010

(54) DRILL GUIDE WITH REMOVEABLE CLAMP RETAINER

(75) Inventor: Scott Lee Clark, Boone, IA (US)

(73) Assignee: Allen IP Inc., Huxley, IA (US)

( * ) Notice: Subject to any disclaimer, the term of this patent is extended or adjusted under 35 U.S.C. 154(b) by 558 days.

(21) Appl. No.: 11/894,253

(22) Filed: Aug. 20, 2007

(65) Prior Publication Data

US 2009/0053003 A1 Feb. 26, 2009

(51) Int. Cl.
*B23B 47/28* (2006.01)
(52) U.S. Cl. .................................. 408/115 R; 408/103
(58) Field of Classification Search ............... 408/72 R, 408/72 B, 97, 103, 115 R, 115 B, 241 B; 81/418, 420–423; *B23B 47/28, 49/00, 49/02*
See application file for complete search history.

(56) References Cited

U.S. PATENT DOCUMENTS

| | | | |
|---|---|---|---|
| 1,128,970 A | 2/1915 | Godefroy et al. | |
| 1,401,262 A | 12/1921 | Kranz | |
| 1,445,908 A * | 2/1923 | Perkins | 81/347 |
| 1,890,664 A | 12/1932 | Alden | |
| 1,919,900 A | 7/1933 | Moller | |
| 2,181,746 A | 11/1939 | Siebrandt | |
| 2,260,784 A | 10/1941 | Morton | |
| 2,268,930 A | 1/1942 | Edwards | |
| 2,436,941 A | 3/1948 | Sendoykas | |
| 2,490,718 A | 12/1949 | Stellin | |
| 2,519,468 A | 8/1950 | Hengst | |
| 2,522,400 A | 9/1950 | Polkosnik | |
| 2,574,281 A | 11/1951 | Olson | |
| 2,602,238 A | 7/1952 | Wellman | |
| 2,674,907 A | 4/1954 | Zoll | |
| 2,843,167 A | 7/1958 | Rushton | |
| 3,069,933 A | 12/1962 | McCall | |
| 3,263,531 A | 8/1966 | Sammons et al. | |
| 3,306,137 A | 2/1967 | Mele | |
| 3,386,318 A | 6/1968 | Pekarcik et al. | |
| 3,465,620 A | 9/1969 | Hilburn | |
| 3,626,513 A | 12/1971 | Pytlak | |
| 3,708,237 A | 1/1973 | Kruse | |

(Continued)

FOREIGN PATENT DOCUMENTS

CH 302233 10/1954

(Continued)

*Primary Examiner*—Daniel W Howell
(74) *Attorney, Agent, or Firm*—Shumaker & Sieffert, P.A.

(57) ABSTRACT

A drill guide apparatus includes a body providing a workpiece clamping surface. The body includes one or more drill guides, wherein the one or more drill guides pass through the workpiece clamping surface at an acute angle, a first track, and a second track. The drill guide apparatus further comprises a first slider mounted on the first track, and a second slider mounted on the second track. The first slider includes a first extrusion that extends beyond the workpiece clamping surface and is slideable along the first track to adjust the position of the first extrusion relative to the workpiece clamping surface. The second slider includes a second extrusion that extends beyond the workpiece clamping surface and is slideable along the second track to adjust the position of the second extrusion relative to the workpiece clamping surface. The drill guide may also include a removeable clamp retainer.

26 Claims, 8 Drawing Sheets

U.S. PATENT DOCUMENTS

| | | | |
|---|---|---|---|
| 3,735,972 A | 5/1973 | Blatt | |
| 3,804,546 A * | 4/1974 | Boyajian | 408/115 R |
| 4,027,992 A | 6/1977 | Mackey, Sr. et al. | |
| 4,385,755 A | 5/1983 | Mawer | |
| 4,466,601 A | 8/1984 | Raines | |
| 4,594,032 A | 6/1986 | Warburg | |
| 4,601,618 A | 7/1986 | McEldowney | |
| 4,730,959 A | 3/1988 | Aerni et al. | |
| 4,747,588 A | 5/1988 | Dillhoff | |
| 4,759,666 A | 7/1988 | Grab | |
| 4,809,424 A | 3/1989 | Bianchi et al. | |
| 4,842,453 A | 6/1989 | Raines et al. | |
| 4,904,130 A | 2/1990 | Gorman | |
| 4,955,766 A | 9/1990 | Sommerfeld | |
| 5,076,742 A | 12/1991 | Lee et al. | |
| 5,163,792 A | 11/1992 | Slavik | |
| 5,322,396 A * | 6/1994 | Blacker | 408/72 R |
| 5,676,500 A | 10/1997 | Sommerfeld | |
| 5,791,835 A | 8/1998 | Chiang et al. | |
| 5,800,099 A * | 9/1998 | Cooper | 408/1 R |
| 5,954,461 A | 9/1999 | Lemieux | |
| 6,053,674 A | 4/2000 | Thompson | |
| 6,254,320 B1 | 7/2001 | Weinstein et al. | |
| 6,283,685 B1 | 9/2001 | Lemieux | |
| 6,394,712 B1 | 5/2002 | Weinstein et al. | |
| 6,481,937 B1 | 11/2002 | Sommerfeld et al. | |
| 6,599,064 B1 | 7/2003 | Robinson | |
| 6,622,997 B2 | 9/2003 | Emerson | |
| 6,637,988 B1 | 10/2003 | Park | |
| 6,659,695 B2 | 12/2003 | Park | |
| 6,726,411 B2 | 4/2004 | Sommerfeld et al. | |
| D528,930 S * | 9/2006 | Degen | D10/65 |
| 7,134,814 B1 | 11/2006 | Park | |
| 7,670,089 B2 * | 3/2010 | Chiang | 408/115 R |
| 2001/0036389 A1 | 11/2001 | Park | |
| 2002/0150434 A1 | 10/2002 | Sommerfeld et al. | |
| 2003/0123941 A1 | 7/2003 | Emerson | |
| 2004/0141821 A1 | 7/2004 | Otten | |
| 2005/0089381 A1 | 4/2005 | Liu et al. | |
| 2006/0228180 A1 | 10/2006 | Sommerfeld et al. | |
| 2008/0187404 A1 | 8/2008 | Chiang | |

FOREIGN PATENT DOCUMENTS

| | | |
|---|---|---|
| DE | 144100 | 10/1902 |
| DE | 8613606.2 | 7/1986 |
| EP | 1595627 A2 * | 11/2005 |
| FR | 2360370 | 3/1978 |
| GB | 431711 | 7/1935 |
| GB | 460965 | 2/1937 |
| GB | 840702 | 7/1960 |
| GB | 22999774 | 10/1996 |

* cited by examiner

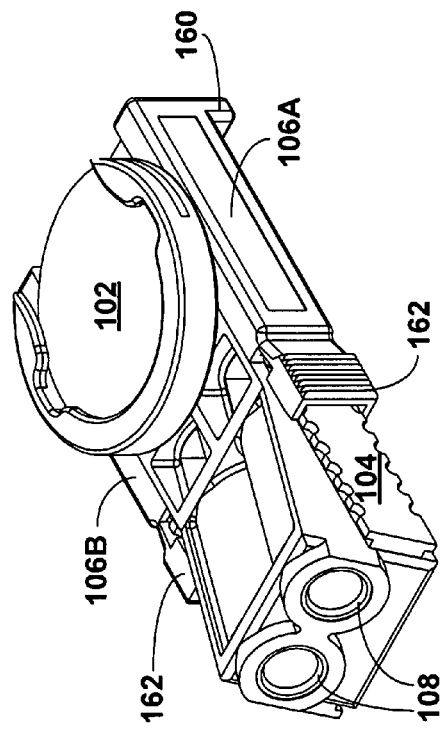
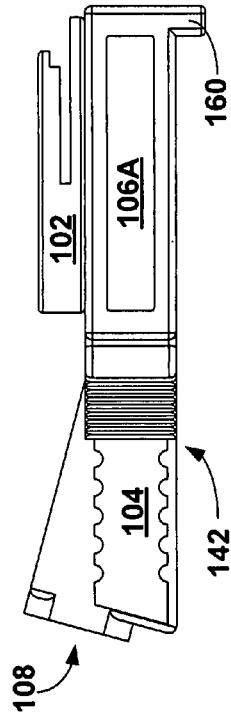
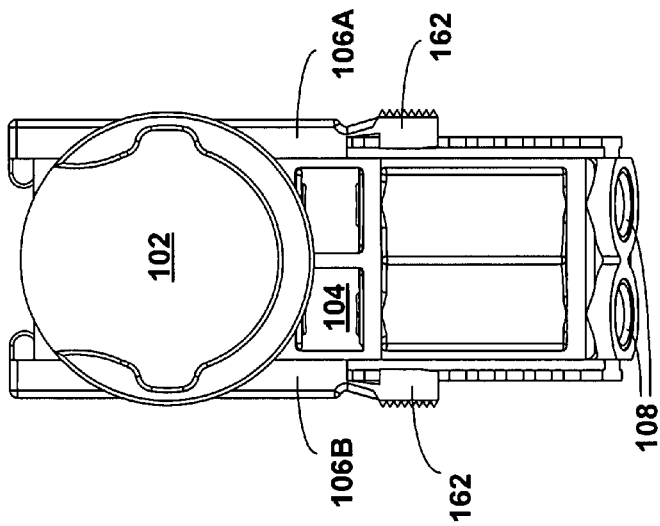
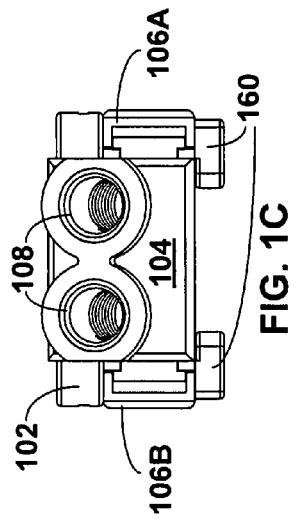
FIG. 1E
FIG. 1D
FIG. 1B
FIG. 1C

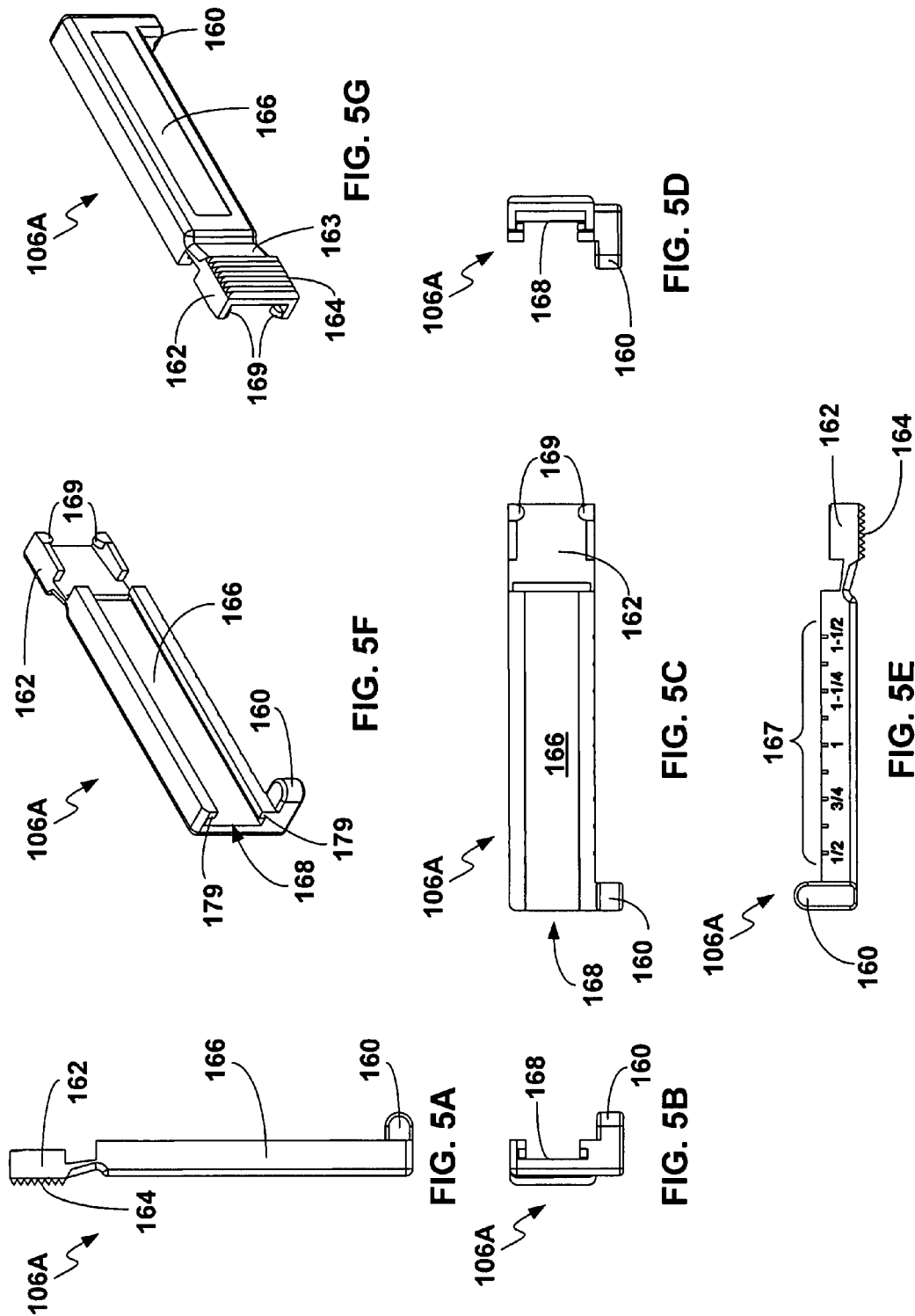

DRILL GUIDE WITH REMOVEABLE CLAMP RETAINER

TECHNICAL FIELD

This invention relates to drill guides used in woodworking and also to clamps for securing such drill guides.

BACKGROUND

Pocket hole tool guides (also referred to as "pocket hole jigs") are used as guides for drilling precisely located holes for pocket hole joinery. For example, pocket hole joinery may be accomplished by drilling a hole at an angle into a first workpiece and then joining the first workpiece to a second workpiece with a self-tapping screw. That is, the self-tapping screw inserted into the hole of the first workpiece and extends into the second workpiece. In this fashion, a pocket hole joint can be formed that fastens to the two workpieces together.

SUMMARY

In general, the invention relates to drill guide fixtures used in woodworking. For example, embodiments of pocket hole jigs for use in pocket hole joinery are described.

As one example, a drill guide apparatus is described herein that includes two individually moveable sliders mounted on in tracks on opposites sides of a drill guide body. The individually moveable sliders are used to accurately and easily position the drill guide apparatus relative to a workpiece. Moreover, the individually moveable sliders allow the drill guides to easily and precisely positioned at a non-perpendicular angle relative an edge of the workpiece. This may advantageously allow the user to accurately position drill guides or other woodworking fixtures at an irregular angle relative to the edge of the workpiece.

Some embodiments of the drill guide apparatus described herein include a removable clamp retainer. For example, the clamp retainer may be configured to secure a specifically designed claim to the drill guide apparatus. However, because the clamp retainer is removeable from the drill guide apparatus, clamps that are not designed to structurally mate with the clamp retainer may still be used with the drill guide apparatus by removal of the clamp retainer. In this manner, the removable clamp adapter described herein provides the convenience of allowing the user to use the specific clamp designed for the fixture, while also providing flexibility for the user to use different claims with the fixture when necessary.

In one embodiment, the invention is directed to a drill guide apparatus comprising a body providing a workpiece clamping surface. The body includes one or more drill guides, wherein the one or more drill guides pass through the workpiece clamping surface at an acute angle, a first track, and a second track. The drill guide apparatus further comprises a first slider mounted on the first track, and a second slider mounted on the second track. The first slider includes a first extrusion that extends beyond the workpiece clamping surface. The first slider is slideable along the first track to adjust the position of the first extrusion relative to the workpiece clamping surface. The second slider includes a second extrusion that extends beyond the workpiece clamping surface. The second slider is slideable along the second track to adjust the position of the second extrusion relative to the workpiece clamping surface.

In another embodiment, the invention is directed to a drill guide apparatus comprising a body including one or more drill guides and providing a workpiece clamping surface, wherein the one or more drill guides pass through the workpiece clamping surface at an acute angle; and a removable clamp retainer removably attached to the body opposite to the workpiece clamping surface.

In another embodiment, the invention is directed to a clamp retainer of a drill guide apparatus configured for a clamp including a circular clamp member. The clamp retainer comprises a first member providing a first surface sized to coincide with the circular clamp member and a second member providing a second surface opposing the first surface. The second member is shaped to allow room for a clamp arm attached to the circular clamp member. The clamp retainer further comprises a sidewall connecting the first member to the second member, wherein the sidewall is sized to coincide with a thickness of the circular clamp member and one or more elastic tabs that elastically deform to allow the circular clamp member to be inserted into and removed from the clamp retainer.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 1A-1G illustrate an example drill guide apparatus including a removeable clamp retainer and two individually moveable sliders to accurately position a workpiece relative to the drill guide apparatus.

FIGS. 5A-5G illustrate an example slider of the drill guide apparatus of FIGS. 1A-1G.

DETAILED DESCRIPTION

FIGS. 1A-1H illustrate an example drill guide apparatus, which may be characterized as a pocket hole jig. The techniques described herein may be applied to other woodworking fixtures, and the pocket hole jig is described as one example. Other drill guide apparatuses include doweling jigs.

Figure 1A:
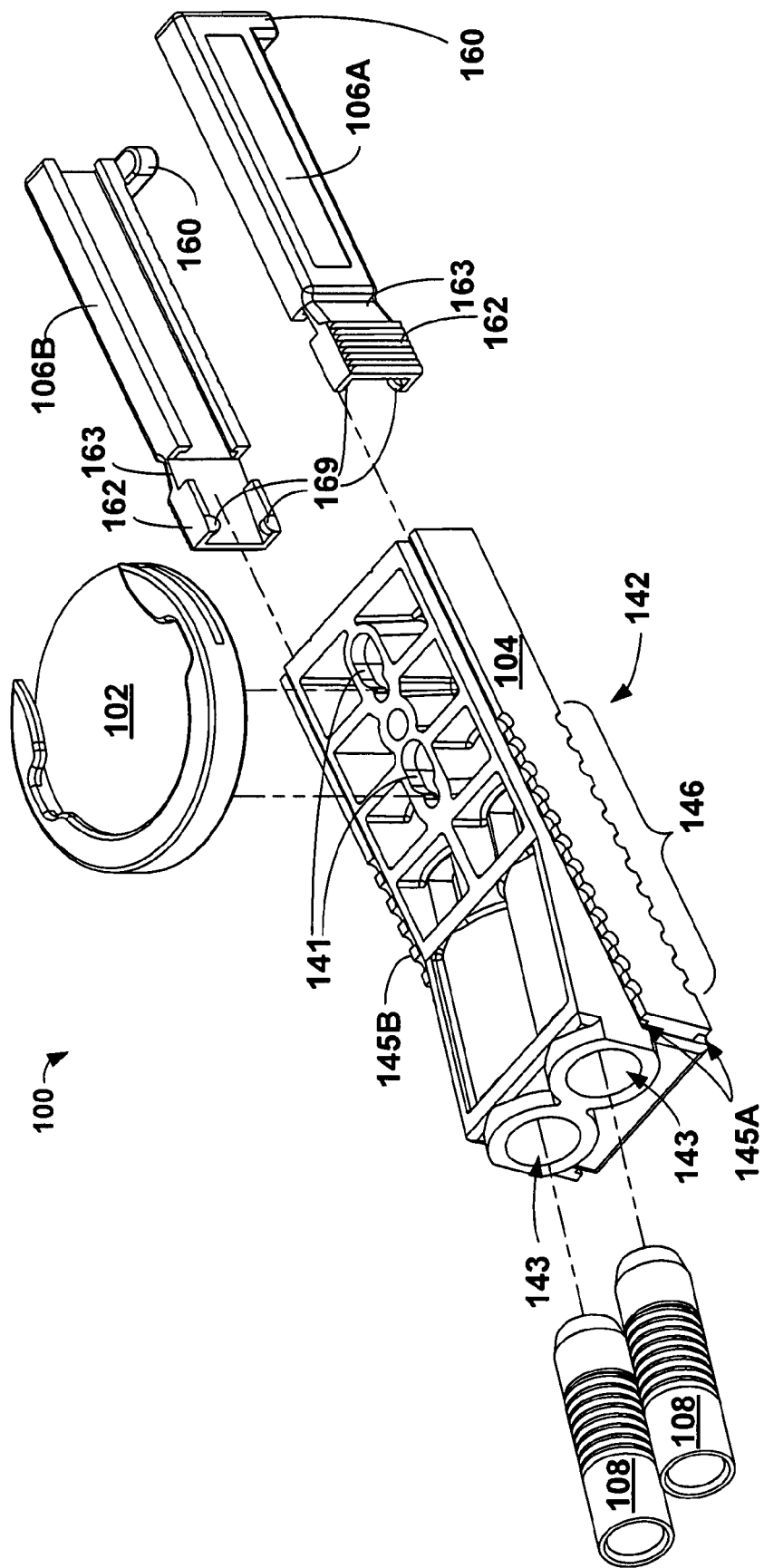
Figure 1G:
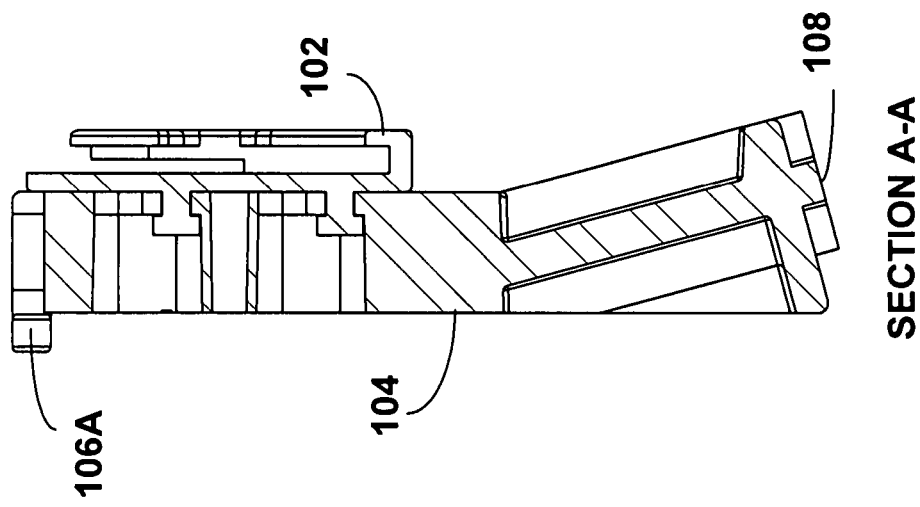

FIG. 1A illustrates an exploded view of the drill guide apparatus 100. FIGS. 1B-1G illustrates a top view, front view, side view, isometric view and bottom view of the drill guide apparatus 100, respectively. FIG. 1G illustrates a cross-sectional view of the drill guide apparatus along section A-A. Drill guide apparatus 100 will be described by way of reference to FIGS. 1A-1G collectively.

As shown in FIGS. 1A-1G, drill guide apparatus 100 includes removable clamp retainer 102 and two individually moveable sliders 106A and 106B (sliders 106) shown removed from the drill guide apparatus. As described herein, sliders 106 allow drill guide apparatus 100 to be accurately positioned relative to a workpiece.

Drill guide apparatus 100 also includes body 104, which provides workpiece clamping surface 142 for securely pressing against a surface of the workpiece in response to force provided by a clamp (not shown in FIG. 1) inserted within clamp retainer 102. Body 104 may be integrally formed from injected molded plastic or other suitable material.

Figure 1F:
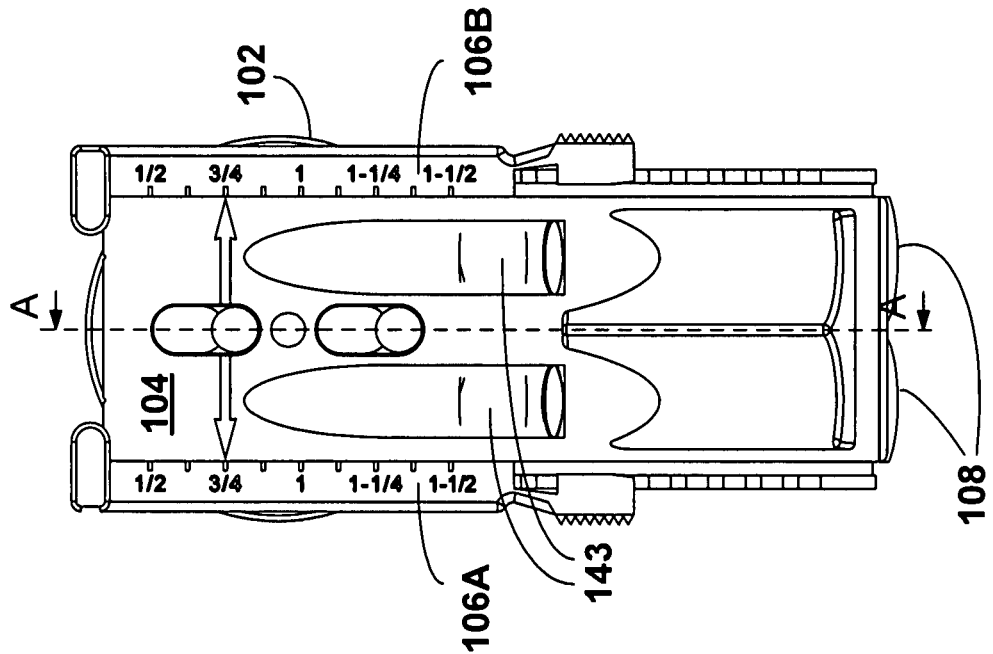

Body 104 also provides drill guides 143 for receiving drill bits or other tools. As best illustrated in FIG. 1F, drill guides 143 pass through workpiece clamping surface 142 at an acute angle and allow the drills to be applied to the workpiece. Drill guide apparatus 100 also includes drill guide inserts 108, which protect body 104 as a drill bit or other tool passes through drill guides 143. For example, body 104 may be formed from a plastic material, whereas drill guide inserts 108 may comprise a metal material.

Body 104 also includes a track 145A having a first set of grooves and a track 145B having a second set of grooves. As shown, each of tracks 145 provide a set of notches 146. Sliders 106 are located on tracks 145 and moveable along tracks 104 and engage notches 146. For example, slider 106 mates with track 145A, which comprises a first groove on a top surface of body 104 and a second groove on a bottom surface of the body. In this way, slider 106A is moveable along one side of body 104. Similarly, slider 106B is positioned within track 145B so as to be moveable along a second side of body 104 opposite the first side on which slider 106A is located. In this way, sliders 106 may be independently moved within the corresponding tracks 106 and can be extended different distances beyond body 104. This may, for example, be useful to accurately position a workpiece at an irregular angle relative to drill guide apparatus 100.

Sliders 106 include extrusions 160 that extend beyond workpiece clamping surface 142. Extrusions 160 are useful to accurately locate a workpiece on workpiece clamping surface 142 according to the positions of sliders 106 relative to body 104. That is extrusions 160 operate to engage the edge of the workpiece regardless of whether sliders 106 are extended equal distances or set to different extensions so as to define an irregular angle relative to the edge of workpiece engaged by the sliders.

Sliders 106 include tabs 162 having knobs 169 that fit within notches 146. Tabs 162 engage notches 146 to secure the positions of sliders 106 relative to body 104 at incremental positions along tracks 145. Tabs 162 are depressible to release knobs 169 from notches 146 to allow sliders 106 to move about tracks 145 as knobs 169 slide within the grooves of tracks 145. That is, each tab 162 may be urged toward the side on which the respective slider 106 is mounted so as to disengage the slider from notches 106, thereby allowing the slider to freely move. To facilitate this operation, sliders 106 include a flexible portion 163 that operates as a spring to urge tabs 162 away from body 104 so as to engage notches 146 when not depressed by the user.

Removable clamp retainer 102 attaches to body 104 opposite workpiece clamping surface 142 and is formed so as to receive a clamp. In the example of FIGS. 1A-1G, clamp retainer 102 includes elastic tabs 124A and 124B (tabs 124) that elastically deform to allow circular clamp member to be inserted into and removed from clamp retainer 102. The clamp may be inserted into clamp retainer 102 and engaged so as to exert a downward force on body 104 and clamping surface 142, thereby fixing drill guide apparatus 100 to the workpiece. As discussed in further detail below, an operator may urge clamp retainer 102 in a direction away from drill guides 143 so as to disengage the clamp retainer for temporary removal.

Figure 2A:
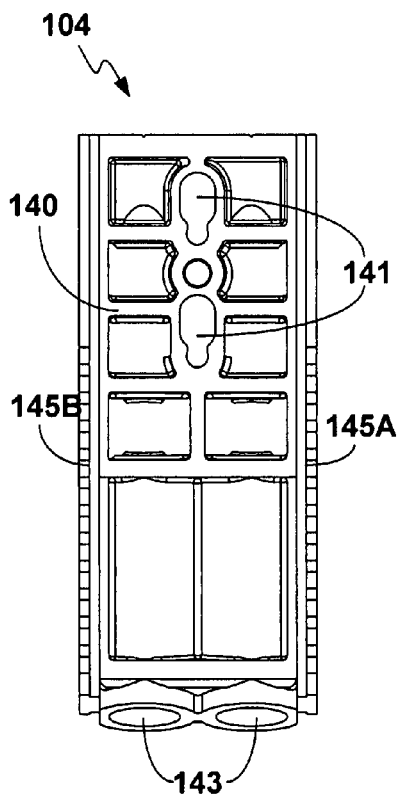
FIGS. 2A-2D illustrate an example body including the drill guides of the drill guide apparatus of FIGS. 1A-1G.
Figure 2D:
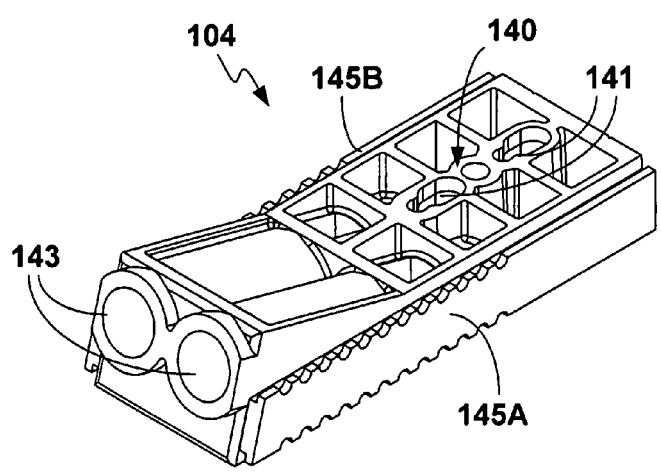
Figure 2B:
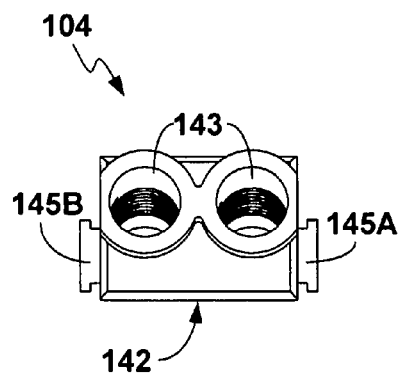
Figure 2C:
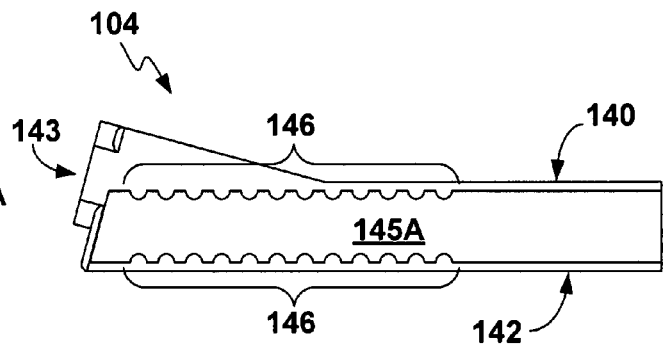

FIGS. 2A-2D illustrate body 104 including drill guides 143 of drill guide apparatus 100 of FIGS. 1A-1H in further detail. More specifically, FIG. 2A illustrates a top view of body 104, FIG. 2B illustrates a front view of body 104, FIG. 2C illustrates a side view of body 104 and FIG. 2D illustrates an isometric view of body 104.

Body 104 is formed so as to provide drill guides 143 and workpiece clamping surface 142. As shown in FIG. 2D, drill guides 143 pass through workpiece clamping surface 142 at an acute angle relative to workpiece clamping surface 142. Body 104 also includes tracks 145 and slots 141.

In the example of FIGS. 2A-2D, drill guides 143 are parallel to each other for guiding a drill bit through a workpiece clamped to workpiece clamping surface 142. For example, a workpiece may be located relative to body 104 such that drill guides 143 position a drill bit along a line that approximately intersects the center of a workpiece surface oriented perpendicular to workpiece clamping surface 142.

As shown in FIGS. 2A-2B, body 104 includes slots 141 to receive removable clamp retainer 102. More specifically, removable claim retainer may include a plurality of pegs (e.g., pegs 126 of shown FIGS. 3A-3D) that lock into body 104 by insertion and upward traversal within slots 141. When pegs 126 are secured within slots 141, removable clamp retainer 102 is attached to body 104 on surface 140, which is opposite workpiece clamping surface 142 (e.g., as shown in FIG. 1E). However, when removable claim retainer 102 is removed from body 104, surface 140 is exposed. When exposed, non-standard clamps (i.e., clamps not designed to engage removable clamp adapter 102) may be positioned on surface 140 to secure drill guide apparatus 100 of FIGS. 1A-1H.

Figure 3A:
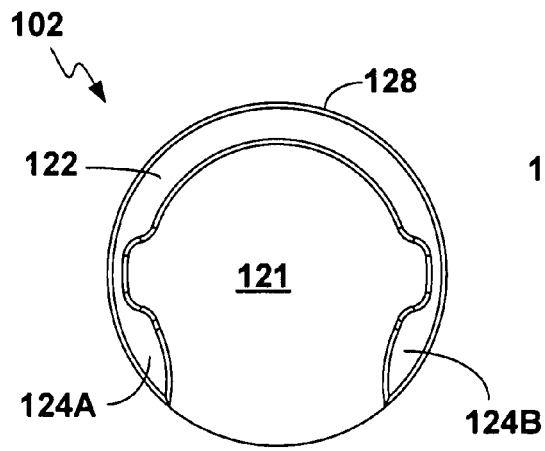
FIGS. 3A-3D illustrate an example removable clamp retainer of the drill guide apparatus of FIGS. 1A-1G.
Figure 3D:
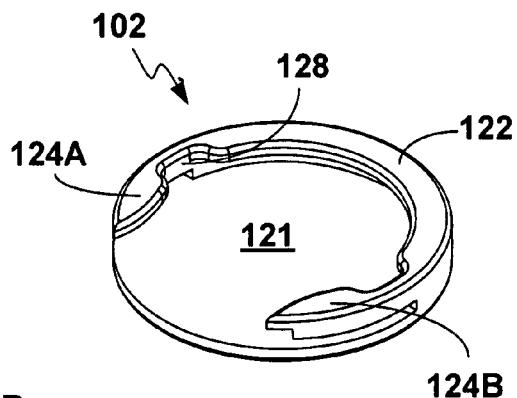
Figure 3B:
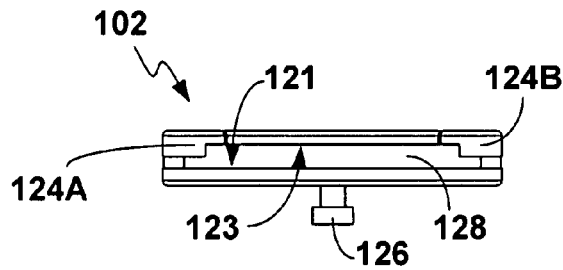
Figure 3C:
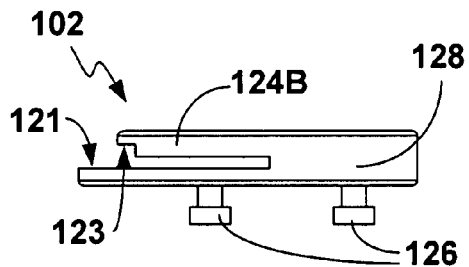

FIGS. 3A-3D illustrate the example removable clamp retainer 102 of drill guide apparatus 100 of FIGS. 1A-1H in further detail. More specifically, FIG. 3A illustrates a top view of removeable clamp retainer 102, FIG. 3B illustrates a front view of removeable clamp retainer 102, FIG. 3C illustrates a side view of removeable clamp retainer 102 and FIG. 3D illustrates an isometric view of removeable clamp retainer 102.

Clamp retainer 102 includes pegs 126, which allow clamp retainer 102 to be removably mounted to a woodworking fixture, such as a drill guide, e.g., a pocket hole jig. Clamp retainer 102 is approximately circular in shape and, therefore, is sized for receiving a clamp having a circular clamp surface. That is, clamp retainer 102 is formed to provide a circular clamping surface 121, which is sized to coincide with the circular clamp member. For example, clamp retainer 102 may be configured for clamp 300 of FIG. 8, which includes circular clamp member 332.

Clamp retainer 102 also includes an outer retaining ring 122. Retaining ring 122 provides surface 123, which opposes surface 121, to prevent movement of the clamp. Retaining ring 122 extends as a lip that wraps around the clamp, the lip being sized to allow room for a clamp arm attached to the outer surface of the circular clamp. For example, member 122 may be shaped to provide a clamp arm attached to the circular clamp member access to the circular clamp when the circular clamp is secured within clamp retainer 102.

Clamp retainer 102 further includes sidewall 128, which connects retaining ring 122 to clamping surface. Sidewall 122 is sized to coincide with a thickness of the circular clamp member.

Clamp retainer 102 also includes elastic tabs 124. Elastic tabs 124 elastically deform by flexing outward to allow a circular clamp member to be inserted into and removed from clamp retainer 102. For example, clamp retainer 102 may be formed from an elastically deformable plastic material. In the example of FIGS. 3A-3C, elastic tabs 124 are formed as integral portions of retaining ring 122 and sidewall 128. In this way, elastic tabs 124 may provide an interference fit with a circular clamp member secured by the clamp retainer 102.

Figure 4A:
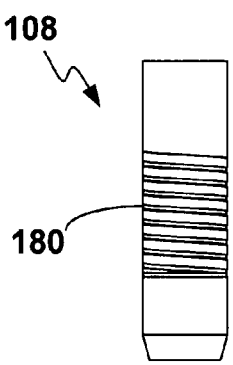
FIGS. 4A-4C illustrate an example metal insert that lines a drill guides of the drill guide apparatus of FIGS. 1A-1G.
Figure 4C:
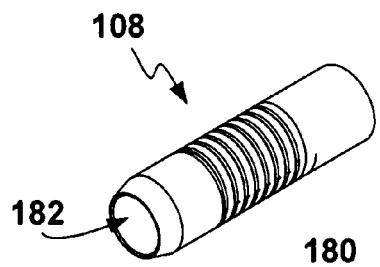
Figure 4B:
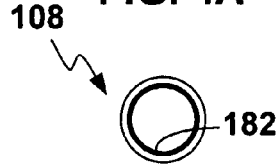

FIGS. 4A-4C illustrate a metal insert 108 that lines one of drill guides 143 of drill guide apparatus 100 of FIGS. 1A-1H. More specifically, FIG. 4A illustrates a top view of metal insert 108, FIG. 3B illustrates a front view of metal insert 108, and FIG. 4C illustrates an isometric view of metal insert 108.

Metal insert 108 serves to protect body 104 from an operating drill within drill guides 143. Metal insert 108 includes inner surface 182, which is sized to precisely constrain a drill bit, such as a step drill bit for pocket hole drilling. Metal insert 108 includes ridges 180 to secure metal insert 108 within body 104. Metal insert 108 may be an integral part of body 104. For example, body 104 may be overmolded on two metal inserts 108: one for each of drill guides 143.

FIGS. 5A-5G illustrate slider 106A of drill guide apparatus 100 in further detail. More specifically, FIG. 5A illustrates a top view of slider 106A, FIG. 5B illustrates a front view of slider 106A, FIG. 5C illustrates a side view of slider 106A, FIG. 5D illustrates a back view of slider 106A, FIG. 5E illustrates a bottom view of slider 106A, FIG. 5F illustrates an isometric view of slider 106A, and FIG. 5G also illustrates an isometric view of slider 106A. Slider 106B is a symmetrical copy of slider 106A; therefore, the following description of slider 106A similarly applies to slider 106B.

Figure 6A:
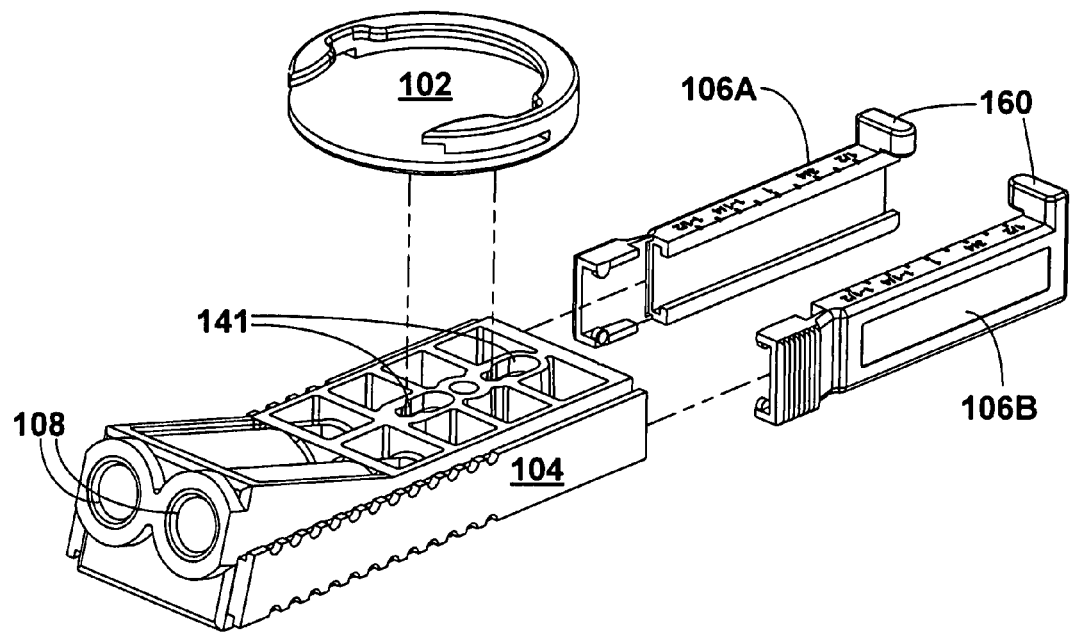
FIGS. 6A-6B illustrate the drill guide apparatus of FIGS. 1A-1G with the sliders inverted.
Figure 6B:
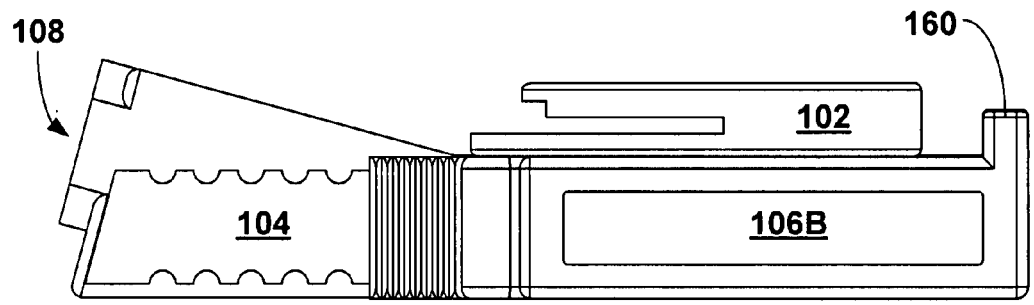

Slider 106A includes an elongated member 166 that is generally u-shaped to form groove 168 for engaging a side of body 104 of the drill guide apparatus. That is, slider 106A may be mounted such edges 179 of u-shaped member 166 track 145A of body 104 (FIGS. 2A-2D) such that groove 168 mates with the grooves of track 145A. Slider 106A also includes extrusion 160. When slider 106A is mounted on track 145A, extrusion 160 extends beyond workpiece clamping surface 142 of body 104. Slider 106A may be inverted and mounted on track 145B, e.g., as shown in FIGS. 6A-6B. When slider 106A is mounted on track 145B in this fashion, extrusion 160 points in an opposite direction and does not extend beyond workpiece clamping surface 142 of body 104.

Slider 106A includes depressible tab 162 extending from a flexible portion 163 of body 166. Depressible tab 162 includes grip 164 and knobs 169. Knobs 169 fit within notches 146 of body 104 (FIGS. 2A-2D) to secure the position of slider 106A relative to body 104 at incremental positions along track 145A. Tab 162 is depressible to release knobs 169 from notches 146 to allow slider 106A to move about track 145A.

Slider 106A also includes marks 167 that provide visible indicia of an extension of slider 106A relative to a workpiece thickness. That is, marks 167 indicate a position of slider 106A relative to body 104. Marks 167 represent a workpiece thickness corresponding to a positions slider 106A relative to body 104. For example, the indicated workpiece thickness may represent a thickness of a workpiece for which drill guides 143 of body 104 would intersect the center of a surface of the workpiece oriented perpendicular to workpiece clamping surface 142 of body 104.

FIGS. 6A-6B illustrate drill guide apparatus 100 of FIGS. 1A-1H with sliders 106 inverted. Compared with the assembly of FIGS. 1A-1H, slider 106A is located on track 145B instead of track 145A. Likewise, slider 106B is located on track 145A instead of track 145B. As shown in FIGS. 6A-6B, extrusions 160 do not extend beyond workpiece clamping surface 142 when slider 106A is interchange with slider 106B. This configuration of drill guide apparatus 100 may be useful in certain situations where extrusions 160 would not normally allow drill guide apparatus 100 to be positioned as desired. For example, extrusions 160 could get in the way if a user was attempting to use drill guide apparatus 100 for repairing a joint of an assembled cabinet from inside the cabinet. Sliders 106 may still be used to accurately position drill guide apparatus 100 relative to a workpiece although the thickness of extrusions 160 needs to be taken into account.

Figure 7:
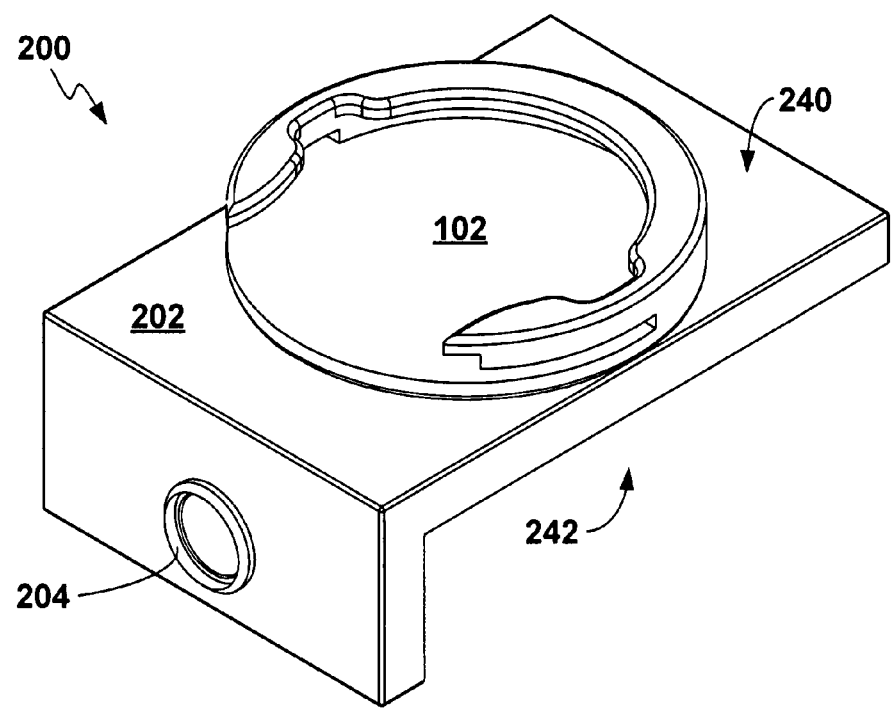
FIG. 7 illustrates a doweling jig including a removeable clamp retainer.

FIG. 7 illustrate doweling jig 200 on which removable clamp retainer 102 is affixed. Doweling jig 200 is a drill guide apparatus that includes L-bracket 202 and drill guide 204. L-bracket 202 provides workpiece clamping surface 242. Removeable clamp retainer 102 is removably attached to L-bracket 202 on surface 240, which is opposite to workpiece clamping surface 242. In this manner, removable clamp retainer 102 may be interchanged between with a variety of different types of woodworking fixtures, and a set of differently sized and shaped clamp retainers may be provided as a kit for use with a variety of different types of clamps.

Figure 8:
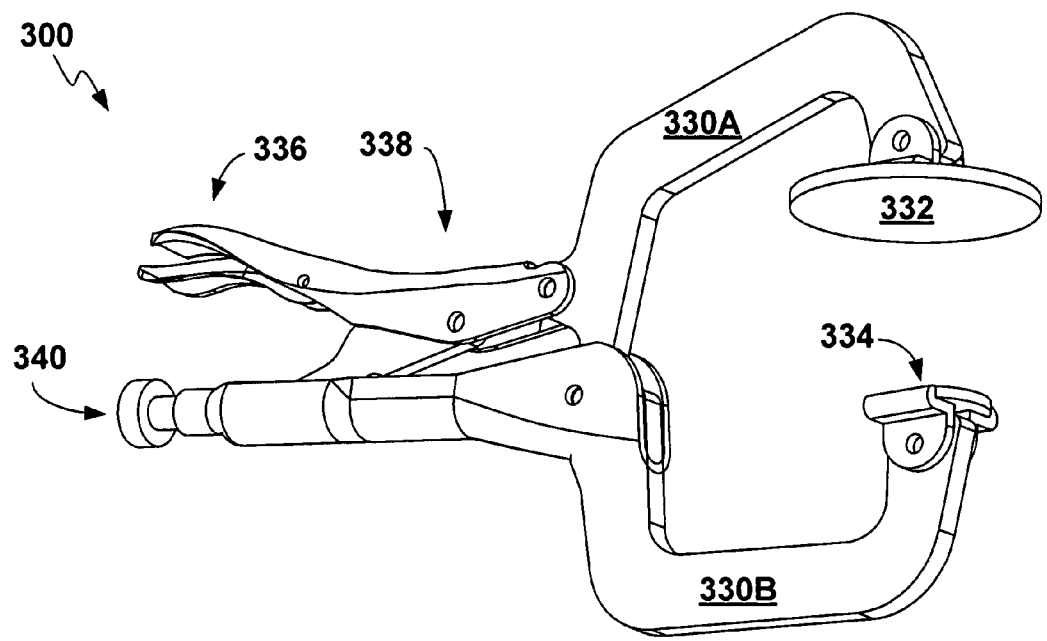
FIG. 8 illustrates a clamp including a circular clamp member.

FIG. 8 illustrates clamp 300, which includes circular clamp member 332. Clamp 300 may be used with drill guide apparatus 100 of FIGS. 1A-1H and doweling jig 200 of FIG. 7.

Clamp 300 also include clamp member 334, which opposes circular clamp member 332. Circular clamp member 332 and clamp member 334 are mounted on clamp arms 330A and 330B respectively. Clamp 300 also includes handle 336, clamp mechanism 338 and clamp mechanism adjustment screw 340.

Another example of clamp including a circular disc clamp member is shown in U.S. Pat. No. 5,676,500, the entire contents of which are herein incorporated by reference.

Various embodiments of the invention have been described. These and other embodiments are within the scope of the following claims.

The invention claimed is:

1. A drill guide apparatus comprising:
a body providing a workpiece clamping surface, wherein the body includes,
one or more drill guides that pass through the workpiece clamping surface at an acute angle,
a first track formed within the body, and
a second track formed within the body;
a first slider mounted on the first track, wherein the first slider includes a first extrusion that extends beyond the workpiece clamping surface, wherein the first slider is slideable along the first track to adjust the position of the first extrusion relative to the workpiece clamping surface; and
a second slider mounted on the second track, wherein the second slider includes a second extrusion that extends beyond the workpiece clamping surface, wherein the second slider is slideable along the second track to adjust the position of the second extrusion relative to the workpiece clamping surface.

2. The drill guide apparatus of claim 1, further comprising one or more marks that indicate the positions of the first slider and the second slider relative to the body.

3. The drill guide apparatus of claim 2, wherein the one or more marks represent a workpiece thickness corresponding to the positions of the first slider and the second slider relative to the body.

4. The drill guide apparatus of claim 1, wherein the first slider is interchangeable with the second slider, wherein locating the first slider on the second track and locating the second slider on the first track orients the first slider and the second slider such that the first extrusion and the second extrusion do not extend beyond the workpiece clamping surface.

5. The drill guide apparatus of claim 1, wherein the body comprises a plastic material, wherein the body includes one or more metal drill guide inserts for the one or more drill guides.

6. The drill guide apparatus of claim 1, wherein the tracks include notches, wherein the sliders include depressible tabs, wherein the tabs interact with the notches to secure the positions of the sliders relative to the body at incremental positions along the tracks.

7. The drill guide apparatus of claim 1, wherein the first and the second slider may be independently positioned relative to the body to orient the one or more drill guides at a non-perpendicular angle relative to an edge of a workpiece that contacts the first extrusion and the second extrusion.

8. The drill guide apparatus of claim 1, further comprising a removable clamp retainer removably attached to the body opposite to the workpiece clamping surface.

9. The drill guide apparatus of claim 8, wherein the removable clamp retainer comprises:
   a first member providing a first surface sized to coincide with a circular clamp member;
   a second member providing a second surface opposing the first surface, wherein the second member is shaped to allow room for a clamp arm attached to the circular clamp member;
   a sidewall connecting the first member to the second member, wherein the sidewall is sized to coincide with a thickness of the circular clamp member; and
   one or more elastic tabs that elastically deform to allow the circular clamp member to be inserted into and removed from the clamp retainer.

10. A drill guide apparatus comprising:
   a. body including one or more drill guides and providing a workpiece clamping surface, wherein the one or more drill guides pass through the workpiece clamping surface at an acute angle; and
   a removable clamp retainer removably attached to the body opposite to the workpiece clamping surface, wherein the removable clamp retainer comprises:
      a first member providing a first surface sized to coincide with a circular clamp member;
      a second member providing a second surface opposing the first surface, wherein the second member is shaped to allow room for a clamp arm attached to the circular clamp member;
      a sidewall connecting the first member to the second member, wherein the sidewall is sized to coincide with a thickness of the circular clamp member; and
      one or more elastic tabs that elastically deform to allow the circular clamp member to be inserted into and removed from the clamp retainer.

11. The drill guide apparatus of claim 10,
   wherein the body includes one or more slots opposite the workpiece clamping surface,
   wherein the clamp retainer comprises one or more pegs inserted within the one or more slots to removably attach the clamp retainer to the body.

12. The drill guide apparatus of claim 10, wherein the first surface approximates a profile of the circular clamp member.

13. The drill guide apparatus of claim 10, wherein the second member is shaped to provide a clamp arm attached to the circular clamp member access to the circular clamp member when the circular clamp member is secured by the clamp retainer.

14. The drill guide apparatus of claim 10, wherein the one or more elastic tabs are formed by portions of the second member and the sidewall.

15. A clamp retainer of a drill guide apparatus configured for a clamp including a circular clamp member comprising:
   a first member providing a first surface sized to coincide with the circular clamp member;
   a second member providing a second surface opposing the first surface, wherein the second member is shaped to allow room for a clamp arm attached to the circular clamp member;
   a sidewall connecting the first member to the second member, wherein the sidewall is sized to coincide with a thickness of the circular clamp member; and
   one or more elastic tabs that elastically deform to allow the circular clamp member to be inserted into and removed from the clamp retainer.

16. The clamp retainer of claim 15, further comprising one or more pegs that allow the clamp retainer to be removably mounted to a fixture.

17. The clamp retainer of claim 15, wherein the first surface approximates a profile of the circular clamp member.

18. The clamp retainer of claim 15, wherein the second member is shaped to provide a clamp arm attached to the circular clamp member access to the circular clamp member when the circular clamp member is secured by the clamp retainer.

19. The clamp retainer of claim 15, wherein the clamp retainer is approximately circular in shape.

20. The clamp retainer of claim 15, wherein the one or more elastic tabs are formed by portions of the second member and the sidewall.

21. The clamp retainer of claim 15, wherein the one or more elastic tabs provide an interference fit with the clamp member when the clamp member is secured by the clamp retainer.

22. The clamp retainer of claim 15, wherein the clamp retainer comprises a plastic material.

23. A drill guide apparatus comprising:
   a body including one or more drill guides and providing a workpiece clamping surface, wherein the one or more drill guides pass through the workpiece clamping surface at an acute angle; and
   a removable clamp retainer removably attached to the body opposite to the workpiece clamping surface, the removable clamp retainer including one or more elastic tabs that allow a clamp member of a clamp to be secured by the clamp retainer,
   wherein the one or more elastic tabs elastically deform to allow the clamp member to be inserted into and removed from the clamp retainer.

24. The drill guide apparatus of claim 23, wherein the one or more elastic tabs provide an interference fit with the clamp member when the clamp member is secured by the clamp retainer.

25. The drill guide apparatus of claim 23,
   wherein the body includes one or more slots opposite the workpiece clamping surface,
   wherein the clamp retainer comprises one or more pegs inserted within the one or more slots to removably attach the clamp retainer to the body.

26. The drill guide apparatus of claim 23,
   wherein the clamp member is a circular clamp member, and
   wherein the clamp retainer is approximately circular in shape and is sized for receiving the circular clamp member.

* * * * *